June 2, 1964     F. J. NEUGEBAUER     3,135,322
LIQUID COOLED CONDENSER
Filed April 6, 1961
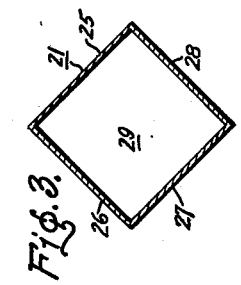
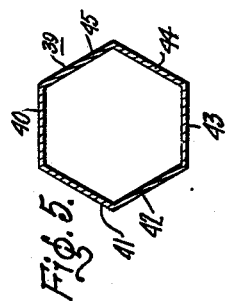
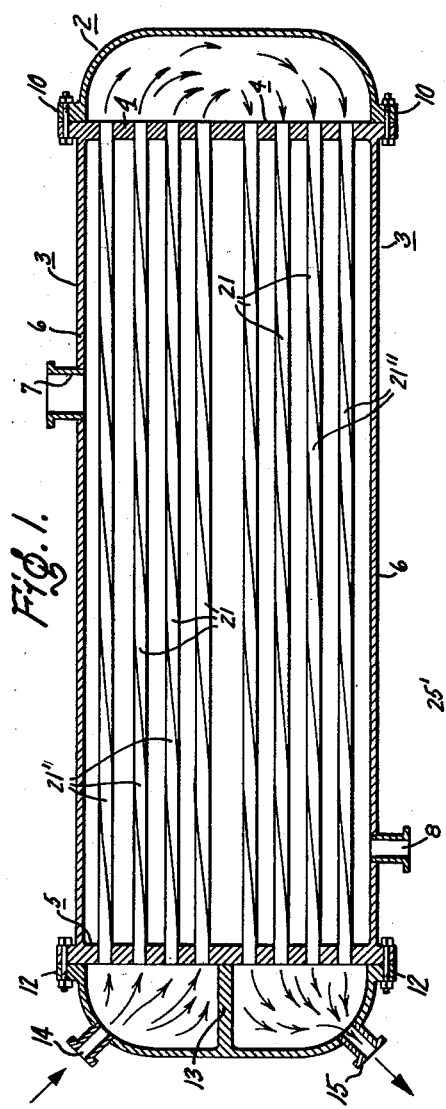
Inventor
Franz J. Neugebauer
by Paul A. Frank
His Attorney

United States Patent Office 3,135,322
Patented June 2, 1964

3,135,322
LIQUID COOLED CONDENSER
Franz J. Neugebauer, Schenectady, N.Y., assignor to General Electric Company, a corporation of New York
Filed Apr. 6, 1961, Ser. No. 101,266
2 Claims. (Cl. 165—158)

The present invention relates to heat exchange members and, more particularly, to liquid cooled condensers.

Steam power plants and similar installations generally are located near large bodies of water for two reasons. Firstly, the boilers in the installation most commonly use water as a supply of heat exchange medium and secondly, large quantities of cooling water are usually required to condense the heat exchange medium during operation. Another criterion for power plant location is close proximity to the area of the power use. From a consideration of the importance of this latter criterion, it can be appreciated that the water available at the use site may be of poor quality for many reasons such as the presence of sewage and industrial waste. The water used as heat exchange medium requires and receives extensive treatment. However, such treatment is not necessary or economically feasible for the water utilized for cooling purposes.

After a rudimentary straining, cooling water may be passed through the condenser of an installation and after a period of use as determined by the character of the water, the condenser tubes may be covered with chemical waste, jelly-like sludges, sand, algae, and microscopic animals. This coating in the tubes builds up to a point where the resistance to heat transfer through the tubes reaches a level making the condenser inadequate for its intended use.

Fouled condenser tubes are cleaned in many ways, for example, the cleaning operation may be performed by recirculating plugs through the tubes with the cooling water and in many cases, it is possible with this procedure to regain the high heat transfer levels initially achieved in the apparatus. However, it is more commonly necessary to dismantle the condenser to expose the tubes and perform a cleaning operation with wire brushes, by sand blasting, or by forcing rubber plugs through the tubes with compressed air to remove the sediment therein. Accordingly, it is very common to use heat exchange tubes having a circular cross section to facilitate cleaning of the surfaces.

The need for extensive cleaning practices has restrained the use of swirlers and other inserts which promote turbulence in the heat exchange fluid passing through condensing tubes. Turbulence in the heat exchange medium reduces the film that is formed in the tubes which, as indicated previously, is a large factor in creating heat transfer resistance. Turbulence in the fluid also assists the convection forces in a tube which are desirable for circulating the fluid in the tubes by bringing cool fluid in the center of the tubes to peripheral surfaces. The use of a swirling device in the water cooled condenser tubes may create centrifugal forces in the flowing water in the tube which urge the more dense cool water in the center of the tube to move outwardly and displace the less dense warm water at the inner tube surfaces. By this action, heat transfer through the tube is substantially increased and the turbulence performs a cleaning action on the tube surfaces.

The chief object of the present invention is to provide an improved heat exchange member.

Another object of the invention is to provide an improved heat exchange member having turbulence generating means.

A further object is to provide an improved condenser.

A still further object of the invention is to provide an improved heat exchange tube having turbulence generating means which permit tube cleaning by forcing plugs through the tubes.

A still further object of the invention is to provide a method for cleaning a heat exchange member having improved turbulence generating means therein.

These and other objects of my invention may be more readily perceived from the following description.

One of the features of the present invention is a condenser having a plurality of heat exchange members through which a cooling liquid may be passed. These heat exchange members may have generally polygonal cross sections in which the walls of the polygons extend helically. The inner walls of the heat exchange members may be cleaned by inserting a plug having substantially the shape of the heat exchange member passage whereby movement of the plug through the heat exchange member results in the plug rotating in a manner to conform to and clean the passage surface.

The attached drawings illustrate preferred embodiment of my invention, in which:

FIGURE 1 is a sectional view of a water cooled condenser employing the present invention;

FIGURE 2 is an enlarged fragmentary perspective view partially in section of the tube sheet illustrated in FIGURE 1 utilizing a heat exchange tube fabricated in accordance with the present invention and also partially illustrating the method for cleaning the inside of a tube;

FIGURE 3 is a sectional view taken through line 3—3 in FIGURE 2;

FIGURE 4 is a perspective view of a square cross section plug for utilization in cleaning the tube illustrated in FIGURES 2 and 3;

FIGURE 5 is a sectional view of another embodiment of the tube illustrated in FIGURE 2; and FIGURE 6 is a perspective view of a plug for use in the embodiment shown in FIGURE 5.

While the present invention is described with particular reference to steam condensers used in power plants, it will be appreciated that the invention may be employed in other environments such as refrigeration systems and water cooling devices. FIGURE 1 illustrates a condenser 2 which includes a steam chest 3 comprising a first tube plate 4 and a second tube plate 5 connected by cylindrical plate housing 6. Steam may be introduced through the flanged connection 7 in the upper portion of steam chest 3 and condensate which is formed therein on heat exchange tubes 21 may be collected in the bottom portion of the steam chest and discharged through flanged connection 8.

In the embodiment of the steam condenser shown in FIGURE 1, a two-pass condenser is illustrated having two flanged end housings 10 and 12 which are adapted to be bolted or otherwise connected to tube plates 4 and 5 in such a manner as to provide suitable chambers at the ends of the tubes. End housing 12 may be provided with a separator 13 to divide this end member into two chambers. A flanged connection 14 may extend into the upper chamber of end housing 12 to supply cooling medium such as water to be passed through the upper tube bundle 21'. Cooling medium from upper tube bundle 21' may be redirected in end housing 10 to lower tube bundle 21" for passage to the lower chamber of end housing 12 having a discharge connection 15. It will be appreciated that the present invention may be practiced in other condensers and heat exchange constructions having different circulating paths and/or uses.

FIGURE 2 is an enlarged view, partly in section, of a portion of the tube plate 4 through which extends one of the heat exchange members or tubes 21 shown in FIGURE 1. In FIGURE 2, tube plate 4 has formed therein a cylindrical opening 20 for supporting tube 21 which is in sealing engagement with the opening. Tube 21 comprises end portion 22 and transition portion 24 located adjacent the equi-angular polygonal shaped section of the tube which is shown in FIGURE 3 having a substantially square cross section. In practice, it is desired that tube 21 be fabricated of a square-walled heat exchange surface which may be suitably expanded at each end through transition portion 24 to the tubular portion 22. Preferably end portion 22 has a larger cross-sectional area than the square cross-section portion for a purpose more fully described hereinafter. For purposes of attachment, tube plate 4 may be supplied with a flared portion 23 which permits rolling tube 21 into sealing engagement with opening 20 of plate 4 in a manner well known in the art. If desired, opening 20 may be knurled or grooved for an improved connection. It will be appreciated that other means well known in the art for connecting the tubes into the tube plate may be used and further, if desired, the tube plates may have polygon shaped openings to obviate the above described end portions of the tubes.

FIGURE 3 is a cross-sectional view of tube 21 taken through line 3—3 in FIGURE 2. Tube 21 comprises four normally disposed walls 25, 26, 27, and 28 which define a square cross-section passage 29. Walls 25, 26, 27, and 28 extend helically across steam chest 3, that is, each wall revolves around the axis of the tube at a fixed distance from the axis. For example, a tube fabricated in accordance with the present invention having one-inch wide walls may have a complete twist or revolution in a 40-inch span. The helical configuration of the walls of the tubes causes water supplied to the tubes to swirl. The water or fluid adjacent the walls and the troughs defined by the intersection of the walls flows in a general helical direction imparting centrifugal forces to the fluid which cause turbulence and assist convective flow of the fluid. By imparting turbulent forces to the fluid, the stagnant film which is normally located adjacent the walls of the tubes is substantially removed thereby decreasing the resistance to heat flow through the tube surface. Furthermore, the rotation of the liquid passing through the tube assists convective forces in the liquid wherein the cooler, more dense fluid which is urged outwardly displaces warmer, less dense fluid at the tube surface. The over-all effect is a substantially constant temperature gradient across the fluid passing through the tube.

FIGURE 4 illustrates a cube shape plug preferably fabricated of an elastomeric material which may be utilized with the tube embodied in FIGURES 2 and 3 to permit periodic cleaning of the tube. Normally, it is not feasible to utilize plugs in cleaning the surfaces of heat exchange tubes which utilize swirl generating inserts. The present invention utilizes the continuous tube walls without inserts to generate desired turbulence and convective forces and these surfaces may be cleaned by the utilization of novel plugs.

To clean a tube having a square cross section as shown in FIGURES 2 and 3, a plug 30 having a general cube shape with a periphery substantially identical with the passage 29 in FIGURE 3 is inserted into the cylindrical opening of the end portion 22 of heat exchange tube 21.

As previously noted, the opening is wider and has a greater cross-sectional area than the helically extending portion of the tube having a square cross section. Walls 25', 26', 27' and 28' of plug 30 substantially engage walls 25, 26, 27, and 28 of tube 21 upon insertion of the plug. After plug 30 is inserted, suitable means such as nozzle 30 associated with hose 31 which may be connected to a source of pressurized water or other propelling means may be connected to the tube entrance. The plug, which may be of slightly large cross-sectional area than the inside of the tube to cause the plug to exert a pressure against the tube walls, is propelled through the tube to remove dirt, sludge, and other material from the tube walls. The plug as it passes through the tube maintains intimate contact with the walls so that there is imparted to the plug not only longitudinal movement but the plug is also rotated during its journey through the tube. If desired, other means may be devised for passing the plug through tube 21, such as placing the plug on the end of a reciprocating rod.

In FIGURE 5 there is shown another embodiment of the invention wherein the polygonal cross-section tube is hexagonal in shape, tube 39 having six walls 40, 41, 42, 43, 44, and 45 which in operation function substantially in the manner of the embodiment shown in FIGURE 3. Fluid passed through the inner portion of tube 39 has imparted thereto a swirling action which generates centrifugal forces and turbulence of a magnitude to remove the stagnant fluid film adjacent the walls of the heat exchange member and also assists convective forces to replace warmer heat exchange medium adjacent the tube walls with the cooler water emanating at the center of the fluid stream.

In cleaning tube 39, as illustrated in FIGURE 5, a hexagonal plug 46 (shown in FIGURE 4) may be utilized. Walls 40', 41', 42', 43', 44', and 45' of the plug are adapted to engage corresponding walls in tube 39 so that as plug 46 is propelled longitudinally and rotationally through tube 21' it cleans the walls of the tube.

It will be appreciated that in many instances, plugs 30 and 46 are subjected to distortion because of the twisted nature of tubes 21 and 21' and for this reason, the plugs may be fabricated of an elastomeric material.

The present invention presents a heat exchange tube for use in presently known steam condensers and includes turbulence generating means for increasing heat transfer. The present invention also provides a method for cleaning the novel heat exchange tube which permits retention of the high heat transfer characteristics of the tube with nominal maintenance and expense.

While I have described preferred embodiments of my invention, it will be understood that my invention is not limited thereto since it may be otherwise embodied within the scope of the appended claims.

What I claim as new and desire to secure by Letters Patent of the United States is:

1. In a liquid cooled condenser, the combination of a plurality of heat exchange tubes, means for passing fluid through said tubes, said tubes having inner walls defining a passage with a general polygonal cross section, the walls of said polygon cross section passage extending substantially helically with each wall revolving about the central axis of the tube at the same fixed distance from the axis in a circle of revolution imparting centrifugal force in the fluid.

2. In a liquid cooled condenser, the combination of a plurality of heat exchange tubes, means for passing fluid through said tubes, said tubes having inner walls defining a passage with a general square cross section, the walls of said polygon cross section passage extending substantially helically with each wall revolving about the central axis of the tube at the same fixed distance from the axis in a circle of revolution imparting centrifugal force in the fluid.

(References on following page)

References Cited in the file of this patent

UNITED STATES PATENTS

| | | |
|---|---|---|
| 525,061 | Schmidt et al. | Aug. 28, 1894 |
| 770,599 | Monteagle | Sept. 20, 1904 |
| 830,423 | Fernwell | Sept. 4, 1906 |
| 910,192 | Grouvelle et al. | Jan. 19, 1909 |
| 1,104,714 | Sonnier | July 21, 1914 |
| 1,268,074 | Bancel | May 28, 1918 |
| 1,894,279 | Meyer | Jan. 17, 1933 |
| 1,992,504 | Penniman | Feb. 26, 1935 |
| 2,801,824 | Taprogge | Aug. 6, 1957 |
| 2,893,697 | Hryniszak | July 7, 1959 |

FOREIGN PATENTS

| | | |
|---|---|---|
| 28,099 | Austria | Nov. 15, 1906 |
| 19,846 | Great Britain | Sept. 5, 1907 |
| 1,147,217 | France | June 3, 1957 |